Oct. 3, 1967  J. J. PLESKAC  3,344,466

GAME CLEANING STAND

Filed May 10, 1965  2 Sheets-Sheet 1

*INVENTOR.*
JOHN J. PLESKAC
BY

Oct. 3, 1967    J. J. PLESKAC    3,344,466
GAME CLEANING STAND

Filed May 10, 1965    2 Sheets-Sheet 2

*INVENTOR.*
JOHN J. PLESKAC
BY

United States Patent Office 3,344,466
Patented Oct. 3, 1967

3,344,466
GAME CLEANING STAND
John J. Pleskac, Box 23, Rte. 1, Ulysses, Nebr. 68669
Filed May 10, 1965, Ser. No. 454,379
4 Claims. (Cl. 17—11)

This invention relates to game cleaning stands and more particularly it is an object of this invention to provide a game cleaning stand which has a game-supporting portion of much more economical construction than heretofore available so as to make such stands of more widespread and general use.

In the prior art, devices for supporting poultry by holding the poultry by the legs while the poultry is being cleaned have been proposed in various forms. These poultry supporting devices have, in general, had numerous parts and the elimination of quantities of parts is an object of this invention, so that the game or poultry holding portion of the cleaning stand is economical to manufacture and sell.

A further object is to provide a support section for upholding a game or poultry holding section, the support section being adapted for stability, collapsibility to a position of compact storage, durability, and also economy of manufacture.

A further object is to provide the game holding section of this stand with a convenient bin into which feathers, fur, and cleanings from game and poultry can be received, the bin also having a water drain so that wash water can be conveniently used with the stand.

Still another object of this invention is to provide the bin with a removable receptacle which can be emptied from time to time during the cleaning of a quantity of game or poultry, the receptacle preferably being perforate so that wash water can pass through the bottom thereof.

A further object of the invention is to provide a hunter's cleaning stand which will give dignity to the operation of cleaning poultry and game.

Yet another object is to provide a cleaning stand for making it possible for a tired hunter to more readily face the prospect of the cleaning of game soon after returning from a hunt and when the hunter is probably exhausted.

Other and further objects and advantages of the present invention will be apparent from the following detailed description, drawings and claims, the scope of the invention not being limited to the drawings themselves as the drawings are only for the purpose of illustrating a way in which the principles of this invention can be applied. Other embodiments of the invention utilizing the same or equivalent principles may be used and structural changes may be made as desired by those skilled in the art without departing from the present invention and the purview of the appended claims.

Figure 1:
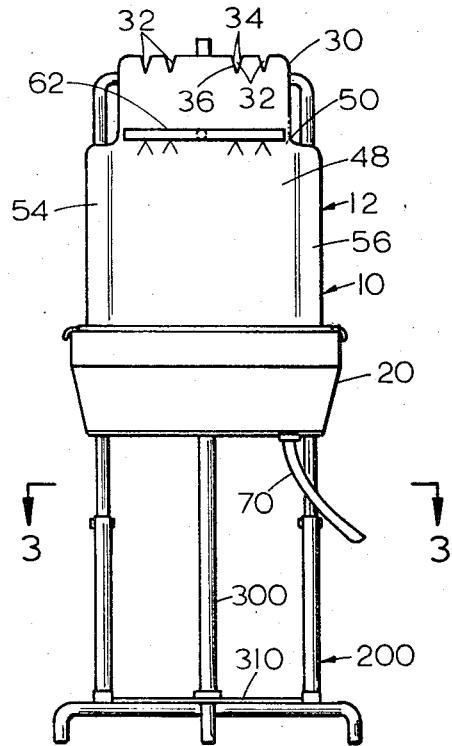
FIGURE 1 is a frontal elevation of the stand of this invention.

Referring to FIGURE 1, the stand of this invention is generally shown at 10 having a poultry or game receiving section generally indicated at 12 and a supporting stand or supporting section generally indicated at 14.

Figure 4:
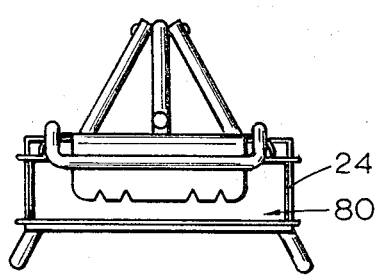
FIGURE 4 is a top plane view of the stand as seen in FIGURE 1.

The game receiving and supporting section 12 is provided at its lower end with a bin 20 which is open on its upper side having a large upper opening 24, best seen in FIGURE 4, which latter is of a size for substantially catching the feathers and fur and cleanings of poultry and game which is disposed thereabove during cleaning.

At a substantial spacing above the bin 20 a leg holder 30 is provided having a plurality of notches 32 therein for receiving the ankles of poultry or small game so that the bird or animal can thereby hang downwardly from the notch 32 and be suspended by its ankles. The notches 32 have walls 34 which converge to lesser size at the inner ends 36 of the notches and this will tend to receive and hold animals of various size leg bones very securely.

The leg holder 30 is preferably formed of a piece of sheet metal and is integral with a back wall 48, which latter extends in upright position substantially across the entire rearward side of the bin 20 and extends horizontally under the notches 32.

The leg holder 30 inclines forwardly and upwardly toward its upper end from a lower portion 50 which is attached to the upper portion of the back wall portion 48. The side edge portions 54 and 56 of the back wall 48 preferably incline forwardly to further contain wash water 60 spraying from a sprinkler head 62.

The delivery of water to wash down the game can be done in any suitable manner and the particular form of sprinkler head shown at 62 is elongated and extends horizontally and is spaced forward from the forward side of the back wall 48 and is supported by a supply pipe 64 attached thereto which extends through the back wall 48 to a rearward portion 66 having a coupling 68 at its lower end for the attachment to a common hose fitting, not shown. As the sprinkler head 62 is optional, it is shown only in FIGURES 1 and 2.

The bin 20 is provided with an outlet drain hose 70 for the wash water and this can lead to a floor drain, not shown.

Figure 5:
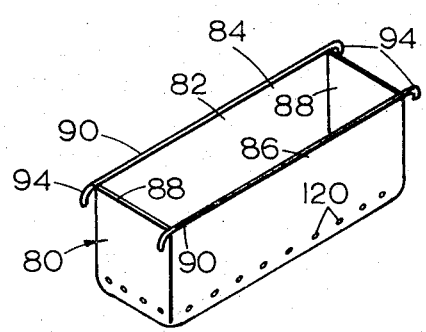
FIGURE 5 is a perspective detail of a removable receptacle used with the invention.

Within the bin 20 a receptacle generally indicated at 80 and best seen in FIGURE 5 can be disposed. The receptacle 80 has an open top 82, a rearward wall 84, forward wall 86, and end walls 88.

Figure 2:
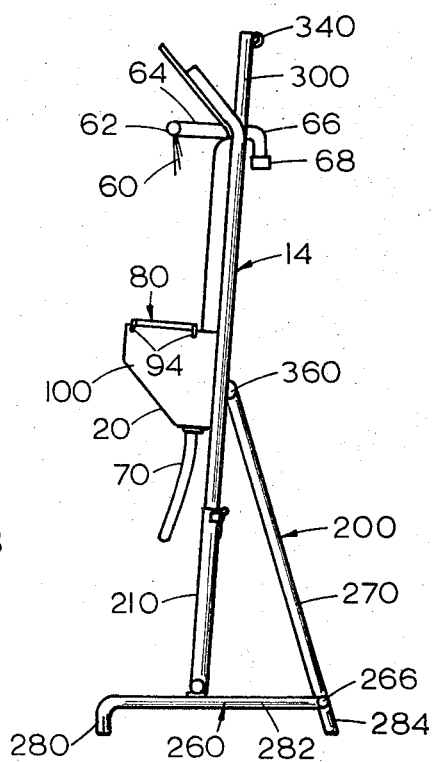
FIGURE 2 is a side elevation of the stand.
Figure 3:
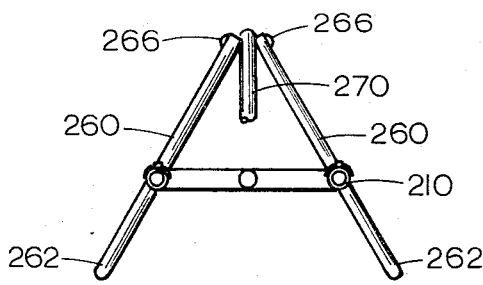
FIGURE 3 is a sectional view taken along the line 3—3 of FIGURE 1.

The receptacle 80 has suitable elongated wire members 90 extending along its forward and rearward walls 84 and 86. The wire members 90 are attached to and support the forward and rearward walls 84 and 86 at the upper edges of the latter for the support of the receptacle in the bin 20 as ends of the wires 90 extend beyond the receptacle 80 and turn downwardly, as best seen at 94 in FIGURE 5, whereby they can be hooked over upper edges of end walls 100 of the bin 20, as best seen in FIGURE 2.

The receptacle 80 is perforate being provided with openings 120 in the bottom thereof to allow the escape of wash water.

Figure 8:
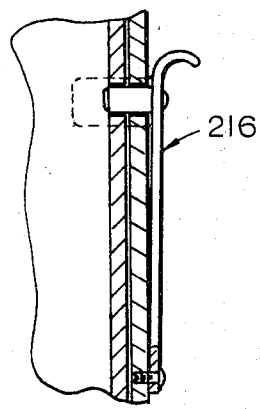
FIGURE 8 is a view-in-section taken along the line 8—8 of FIGURE 6.

The cleaning stand of this invention has a supporting section generally indicated at 200 which latter has a downwardly opening U-shaped portion 202 having upright sides 204 which are suitably fixed to the rearward side of the back wall 48 and are disposed in parallelism therewith. The U-shaped portion 202 has lower ends received in a pair of tubes 210 which also are disposed upright whereby the sides 204 are telescopically arranged in the tubes 210 respectively and releasable retainers 216, such as are shown in detail in FIGURE 8, are provided for maintaining the sides 204 at whatever elevation with respect to the tubes 210 is desired, for the preferable height of the bin 20 and the work area represented by the back wall 48 in accordance with the desires of the user.

Lower ends of the tubes 210 are attached by suitable means 240 to a pair of inclinedly disposed feet 260 respectively, the feet 260 having spaced forward ends 262, and converging at their rearward ends to points of pivoted attachment 266 to a brace 270, which latter inclines upwardly and forwardly from a position substantially spaced to the rearward of the lower ends of the tubes 210.

The feet 260 are attached for pivoting about a horizontal axis with respect to the brace 270 and by means of the suitable means 266.

Forward ends of the feet extend downwardly at 280 from horizontally disposed center portions 282 thereof and the brace 270 has a lower portion 284 extending downwardly below the pivot 266 a short distance, whereby when lower ends of the portions 280 and 284 are disposed on a horizontal surface, the back wall 48 and bin 20 will be disposed upright.

A center post 300 is best seen in FIGURE 1 and is mounted at its lower end on a horizontal bar 310 which extends across and is attached to the feet 260, the post 300 extending upwardly along the back side of the back wall 48 and having at its upper end an eye 340 which can be used for hanging the device up for storage or which can be used for hanging the device on a wall when it is desired not to rest it on a floor during use.

Figure 6:
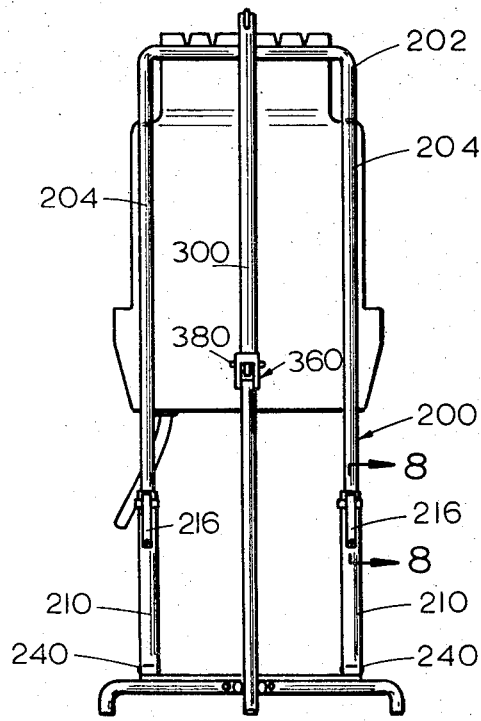
FIGURE 6 is a rear elevation of the stand.
Figure 7:
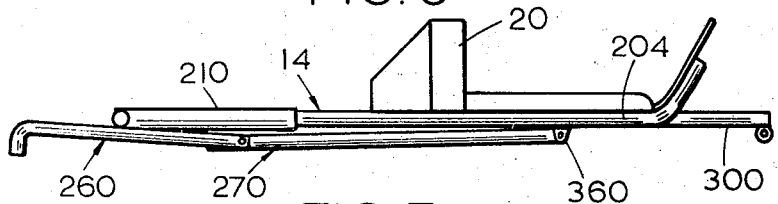
FIGURE 7 is a side view of the stand as seen from the right-hand side similarly to FIGURE 2, but with the stand in collapsed position with its forward side upward.

The center post 300 is suitably attached to the rearward side of the back wall 48 and a suitable attachment fitting generally indicated at 360 in FIGURE 6 attaches the brace 270 to the post 300 in a manner for the pivoting of the brace 270 about a horizontal axis with respect to the post 300 and also in a manner for a sufficient disconnection from the post 300 so as to permit the fitting 360 to be slid along the post 300 at times when a pin 380 thereof is removed in order to allow the support 14 to collapse into the position shown in FIGURE 7, whereby it can be readily stored, and also whereby it can be hung on a wall, lying substantially flat against the wall so that a user can have it wall-mounted during use, if desired.

In operation, it will be seen that the economical poultry or game supporting section 12 can support game suspended by its legs in a very convenient position for the cleaning thereof with the cleanings being washed by the spray 60 down into the receptacle 80 in the bin 20, which latter can be emptied regularly. Much more rapid cleaning, and with greater convenience, will be found possible, lending greater dignity to the hunter's job of cleaning poultry and game.

From the foregoing description, it is thought to be obvious that a game cleaning stand constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

1. A hunter's cleaning stand having a game and poultry supporting section having a bin with an open top for receiving cleanings, an upstanding piece of sheet material extending upwardly from said bin and of a size for guiding drippings into said bin, said sheet material forming a back wall of said supporting section, said piece of sheet material having an upper portion extending angularly forward of the remainder of said back wall, the upper edge of said back wall portion having a plurality of notches therein, said notches opening outwardly and each notch being generally wedge-shaped for the wedging of the appendages of game therein.

2. The combination of claim 1 in further combination with a removable receptacle disposed in said bin, means on said receptacle hooking about upper edges of said bin sufficiently for the support of said receptacle in said bin by suspension from said walls of said bin.

3. The combination of claim 1 in which a back wall is mounted in upright position extending upwardly from the rearward side of said bin for guiding water into said bin, and in further combination with means for delivering wash water to game hanging in the area in front of said back wall, said wash water delivering means having outlet means directed downwardly at the area disposed beneath said notches.

4. The combination of claim 1 in further combination with a perforate receptacle removably disposable within said bin, said receptacle having side walls and forward and rearward walls for retaining a substantial quantity of disposable animal matter therein during cleaning and for allowing liquid animal matter to drain from said receptacle into said bin whereby said receptacle can be removed from said bin for readily disposing of substantial quantities of solid animal matter.

References Cited

UNITED STATES PATENTS

| | | |
|---|---|---|
| 410,226 | 9/1889 | White. |
| 2,677,518 | 5/1954 | Happy et al. _____ 211—178 X |
| 2,735,135 | 2/1956 | Gibbs et al. _____ 17—11 |
| 2,817,874 | 12/1957 | Conaway _____ 17—44.1 |
| 2,874,404 | 2/1959 | Gonzalez _____ 17—44.1 |

LUCIE H. LAUDENSLAGER, *Primary Examiner.*